United States Patent
Liu et al.

(10) Patent No.: US 11,113,560 B2
(45) Date of Patent: Sep. 7, 2021

(54) BODY CONTOUR KEY POINT DETECTION METHODS, APPARATUSES, AND DEVICES

(71) Applicant: BEIJING SENSETIME TECHNOLOGY DEVELOPMENT CO., LTD, Beijing (CN)

(72) Inventors: Wentao Liu, Beijing (CN); Chen Qian, Beijing (CN); Qinqin Xu, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 125 days.

(21) Appl. No.: 16/454,021

(22) Filed: Jun. 26, 2019

(65) Prior Publication Data

US 2019/0318194 A1 Oct. 17, 2019

Related U.S. Application Data

(63) Continuation of application No. PCT/CN2019/070725, filed on Jan. 8, 2019.

(30) Foreign Application Priority Data

Jan. 19, 2018 (CN) .......................... 201810054352.3

(51) Int. Cl.
G06K 9/46 (2006.01)
G06T 7/143 (2017.01)
G06K 9/00 (2006.01)

(52) U.S. Cl.
CPC ....... *G06K 9/4638* (2013.01); *G06K 9/00369* (2013.01); *G06T 7/143* (2017.01);
(Continued)

(58) Field of Classification Search
CPC .. G06F 3/011; G06K 9/00369; G06K 9/4604; G06K 9/4638; G06K 9/48; G06K 9/6271;
(Continued)

(56) References Cited

U.S. PATENT DOCUMENTS

2014/0010409 A1* 1/2014 Yamashita ......... G06K 9/00342
382/103
2016/0275341 A1 9/2016 Li et al.
(Continued)

FOREIGN PATENT DOCUMENTS

CN 104537608 A 4/2015
CN 106021365 A 10/2016
(Continued)

OTHER PUBLICATIONS

International Search Report in the international application No. PCT/CN2019/070725, dated Apr. 4, 2019.
(Continued)

*Primary Examiner* — Bobbak Safaipour
(74) *Attorney, Agent, or Firm* — Syncoda LLC; Feng Ma

(57) ABSTRACT

Body contour key point detection methods, image processing methods, neural network training methods, apparatuses, electronic devices, computer-readable storage media, and computer programs include: obtaining an image feature of an image block including a body; obtaining a body contour key point prediction result of the body by means of a first neural network according to the image feature; and obtaining a body contour key point in the image block according to the body contour key point prediction result; where the body contour key point is used for representing an outer contour of the body.

19 Claims, 11 Drawing Sheets

S100, obtain an image feature of an image block including a body

S110, obtain, by means of a first neural network, a body contour key point prediction result of the body according to the image feature S120, obtain, according to the body contour key point prediction result, a body contour key point in the image block

(52) U.S. Cl.
CPC ............... *G06T 2207/20081* (2013.01); *G06T 2207/20084* (2013.01); *G06T 2207/20116* (2013.01)

(58) Field of Classification Search
CPC .................... G06N 3/0454; G06N 3/08; G06T 2207/20081; G06T 2207/20084; G06T 2207/20116; G06T 7/12; G06T 7/143
See application file for complete search history.

(56) References Cited

U.S. PATENT DOCUMENTS

| | | | | |
|---|---|---|---|---|
| 2019/0012842 | A1* | 1/2019 | Chaudhary | G06F 3/04845 |
| 2019/0206051 | A1* | 7/2019 | Cao | A61B 5/0037 |
| 2020/0042776 | A1* | 2/2020 | Shen | G06K 9/4628 |
| 2020/0098175 | A1* | 3/2020 | Chen | A63F 13/428 |
| 2020/0193152 | A1* | 6/2020 | Vesdapunt | G06F 3/017 |
| 2020/0218883 | A1* | 7/2020 | Wang | G06K 9/6257 |
| 2020/0226754 | A1* | 7/2020 | Liu | G06T 7/149 |
| 2020/0279124 | A1* | 9/2020 | Huang | G06K 9/4671 |

FOREIGN PATENT DOCUMENTS

| | | |
|---|---|---|
| CN | 106203376 A | 12/2016 |
| CN | 106570480 A | 4/2017 |
| CN | 106845400 A | 6/2017 |
| CN | 107092917 A | 8/2017 |
| CN | 107219925 A | 9/2017 |
| CN | 107492108 A | 12/2017 |
| JP | 09-190522 A | 7/1997 |
| JP | 2004174219 A | 6/2004 |
| JP | 2005339288 A | 12/2005 |
| JP | 2012256131 A | 12/2012 |
| JP | 2015075915 A | 4/2015 |
| KR | 20120009710 A | 2/2012 |
| KR | 20130094862 A | 8/2013 |

OTHER PUBLICATIONS

First Office Action of the Chinese application No. 201810054352.3, dated Sep. 30, 2020.
English translation of the Written Opinion of the International Search Authority in the international application No. PCT/CN2019/070725, dated Apr. 4, 2019.
First Office Action of the Japanese application No. 2019-572641, dated Dec. 21, 2020.
First Office Action of the Korean application No. 10-2019-7038937, dated Mar. 29, 2021.
Notice of Allowance of the Chinese application No. 201810054352.3, dated May 25, 2021.
Second Office Action of Japanese Application No. 2019-572641, dated Jun. 24, 2021.

\* cited by examiner

BODY CONTOUR KEY POINT DETECTION METHODS, APPARATUSES, AND DEVICES

CROSS-REFERENCE TO RELATED APPLICATIONS

This is a continuation application of International Patent Application No. PCT/CN2019/070725 filed on Jan. 8, 2019, which claims priority to the Chinese Patent Application No. CN 201810054352.3 filed on Jan. 19, 2018. The disclosures of these applications are incorporated herein by reference in their entirety.

TECHNICAL FIELD

The present disclosure relates to computer vision technologies, and in particular, to body contour key point detection methods, body contour key point detection apparatuses, electronic devices, computer-readable storage media, and computer programs.

BACKGROUND

At present, body key points generally refer to body skeleton key points, and the body key points are mainly used for constructing a body skeleton model. Applications such as body action identification or man-machine interaction can be implemented according to the constructed body skeleton model.

How to obtain more semantic information from an image including a body so that the image may represent richer body structure semantics, thereby providing richer information for the applications is a noteworthy technical problem.

SUMMARY

Embodiments of the present disclosure provide a technical solution of body contour key point detection.

According to an aspect of embodiments of the present disclosure, a body contour key point detection method is provided. The method includes: obtaining an image feature of an image block including a body; obtaining, by means of a first neural network, a body contour key point prediction result of the body according to the image feature; and obtaining, according to the body contour key point prediction result, a body contour key point in the image block; where the body contour key point is used for representing an outer contour of the body.

According to another aspect of the present disclosure, an image processing method is provided. The method includes: detecting a body contour key point of an image block including a body, where the body contour key point is used for representing an outer contour of the body; and performing AR effect rendering processing on the image block according to the body contour key point.

According to another aspect of the present disclosure, a neural network training method is provided. The method includes: obtaining an image feature of a sample image block including a body; obtaining a body contour key point prediction result of the body by means of a first neural network to be trained according to the image feature; and using a difference between the body contour key point prediction result and the body contour key point marking information as guidance information to perform supervised learning on the first neural network to be trained.

According to another aspect of the present disclosure, a body contour key point detection apparatus is provided. The apparatus includes: an image feature obtaining module, configured to obtain an image feature of an image block including a body; a prediction result obtaining module, configured to obtain a body contour key point prediction result of the body by means of a first neural network according to the image feature; and a contour key point obtaining module, configured to obtain a body contour key point in the image block according to the body contour key point prediction result; where the body contour key point is used for representing an outer contour of the body.

According to another aspect of the present disclosure, an image processing apparatus is provided. The apparatus includes: a body contour key point detection apparatus, configured to detect a body contour key point of an image block including a body, where the body contour key point is used for representing an outer contour of the body; and a rendering module, configured to perform AR effect rendering processing on the image block according to the body contour key point.

According to another aspect of the present disclosure, a neural network training apparatus is provided. The apparatus includes: a first module, configured to obtain an image feature of a sample image block including a body; a second module, configured to obtain a body contour key point prediction result of the body by means of a first neural network to be trained according to the image feature; and a third module, configured to use a difference between the body contour key point prediction result and the body contour key point marking information as guidance information to perform supervised learning on the first neural network to be trained.

According to another aspect of the present disclosure, an electronic device is provided. The electronic device includes a processor; and a memory for storing instructions executable by the processor; wherein execution of the instructions by the processor causes the processor to perform any method above when the computer program is executed.

According to another aspect of the present disclosure, a non-transitory computer-readable storage medium is provided. A computer program is configured to store computer-readable instructions, wherein execution of the instructions by the processor causes the processor to perform any method above.

According to another aspect of the present disclosure, a computer program is provided. The computer program includes computer instructions, where when the computer instructions are operated in a processor of a device, any method above is implemented.

Based on the body contour key point detection method, body contour key point detection apparatus, image processing method, image processing apparatus, neural network training method, neural network training apparatus, electronic device, computer-readable storage medium, and computer program provided in the present disclosure, in the present disclosure, the first neural network is used for obtaining the body contour key point, thereby facilitating rapid and accurate precise sketch of the body outer contour in the image, so as to facilitate obtaining of richer body semantics from the image including the body, so that body semantic information can be provided to a corresponding application, for example, the body contour key point extracted from the present disclosure may be used for applications such as sticker processing, body action analysis, and body morphology analysis.

By means of the accompanying drawings and embodiments, the technical solutions of the present disclosure are further described in details.

BRIEF DESCRIPTION OF THE DRAWINGS

The drawings constituting a part of the specification describe embodiments of the present disclosure, and are used for explaining the principles of the present disclosure in combination of the description.

With reference to the drawings, according to the detailed description, the present disclosure can be understood more clearly, where.

DETAILED DESCRIPTION

Figure 1:
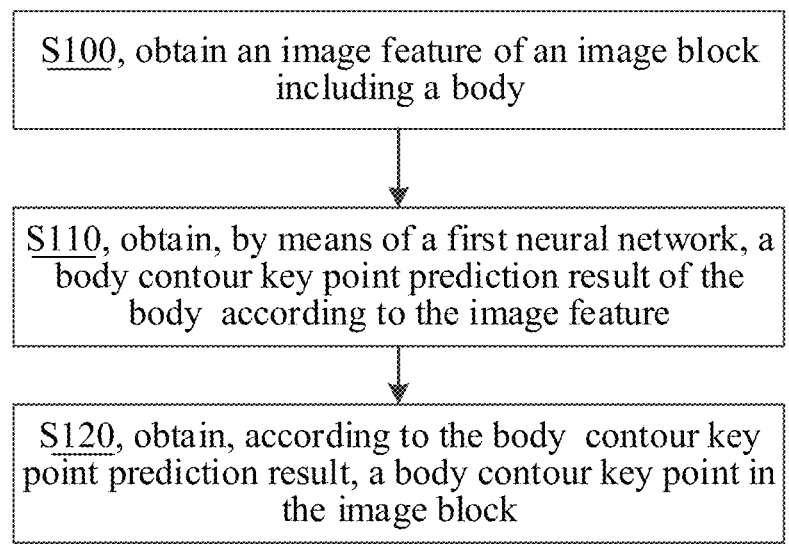
FIG. 1 illustrates a flow chart of an embodiment of a body contour key point detection method of the present disclosure.

Each exemplary embodiment of the present disclosure is described in detail with reference to the accompany drawings now. It should be noted that: unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, servers, which may operate with numerous other general-purpose or special-purpose computing system environments or configurations. Examples of well-known computing systems, environments, and/or configurations suitable for use together with the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems.

The electronic devices such as terminal devices, computer systems, and servers may be described in the general context of computer system executable instructions (for example, program modules) executed by the computer system. Generally, the program modules may include routines, programs, target programs, components, logics, and data structures, to execute specific tasks or implement specific abstract data types. The computer systems/servers may be practiced in the distributed cloud computing environments in which tasks are executed by remote processing devices that are linked through a communications network. In the distributed computing environments, program modules may be located in local or remote computing system storage media including storage devices.

Exemplary Embodiments

Figure 2:
FIG. 2 illustrates a schematic diagram of an embodiment of a body contour key point of the present disclosure.

FIG. 1 is a flow chart of an embodiment of a body contour key point detection method of the present disclosure. As shown in FIG. 1, the method according to the embodiments includes: operations S100, S110, and S120. Each operation in FIG. 2 is illuminated in detail as follows.

S100, an image feature of an image block including a body is obtained; for example, an image feature of an image block including a body in an image to be processed is obtained. According to one or more embodiments of the present disclosure, the body refers to human body.

According to one or more embodiments of the present disclosure, the image to be processed in the present disclosure may be an image such as a picture or photo in a static state, and may also be a video frame in a video in a dynamic state. The body in the image to be processed may be a front body, a side body, or a back body. The body in the image to be processed may be in multiple forms, for example, the body in the image to be processed is in a walking, jumping, squatting, accumbent, or headstand form. In addition, the body included in the image block of the present disclosure may be an intact body (for example, the body shown in FIG. 2), and may also be a partial body (i.e., a part of the body, e.g., a half-length portrait). An expressive form of the body in the image to be processed is not limited in the present disclosure.

According to one or more embodiments of the present disclosure, in the present disclosure, the image feature of the image block including the body in the image to be processed may be obtained by means of a neural network. The neural network in the present disclosure for extracting the image feature of the image block including the body in the image to be processed may be a Convolutional Neural Network (CNN). To be distinguished from a first neural network of the present disclosure, the neural network for extracting the image feature of the image block including the body in the image to be processed is referred to as a second neural network in the present disclosure.

According to one or more embodiments of the present disclosure, in the present disclosure, the image block including the body in the image to be processed may be input into the second neural network and the image feature of the image block is output by means of the second neural network. The size of the image block input into the second neural network is generally associated with a size requirement of an input image of the second neural network, for example, the size of the image block may be 256×256. The present disclosure does not limit the size of the image block.

According to one or more embodiments of the present disclosure, a network structure of the second neural network in the present disclosure may be flexibly designed according to actual requirements for extracting the image feature; the embodiment of the present disclosure does not limit the network structure of the second neural network; for example, the second neural network may include, but not limited to, a convolutional layer, a nonlinear Relu layer, a pooling layer, and a full connection layer. The more the number of layers included by the second neural network, the deeper the network. Furthermore, for instance, the network structure of the second neural network of the present disclosure may adopt, but not limited to, network structures adopted by neural networks such as ALexNet, a Deep Residual Network (ResNet), or Visual Geometry Group Network (VGGnet).

According to one or more embodiments of the present disclosure, the image block in the present disclosure may be the full image of the image to be processed, and may also be a partial image including the body in the image to be processed. In addition, the image block may further be an image block obtained by processing the partial image including the body in the image to be processed. The image block input into the second neural network in the present disclosure may be an image block obtained by cutting the image to be processed. According to one or more embodiments of the present disclosure, the image to be processed may be subjected to body detection first and is cut according to a body detection result, so as to obtain the image block in the present disclosure according to a cutting result.

According to one or more embodiments of the present disclosure, to obtain the image block with a predetermined size, in the present disclosure, the image to be processed may first be scaled, and then the scaled image to be processed is cut to obtain the image block including a body according to the predetermined size. In the present disclosure, the image to be processed can be scaled according to the body detection result, so that the cut image block including the body has the predetermined size. The image to be processed can be scaled and cut by means of the neural network in the present disclosure. To be distinguished from the first neural network and the second neural network in the present disclosure, the neural network for executing scaling and cutting in the present disclosure can be referred to as an input neural network.

According to one or more embodiments of the present disclosure, in the present disclosure, the body detection result and the image to be processed can be provided to the input neural network, thereby obtaining the image block including the body with the predetermined size according to the output of the input neural network in the present disclosure. The body detection result in the present disclosure generally refers to information that can represent the position of a body in the image to be processed. The body detection result of the image to be processed can be obtained by multiple means in the present disclosure, for example, body detection can be performed on the image to be processed using a body detector, thereby obtaining the body detection result. The present disclosure does not limit the implementing mode for body detection on the image to be processed, the structure of the body detector, etc.

According to one or more embodiments of the present disclosure, the body detection result of the present disclosure may include: a central position of a body bounding box in the image to be processed and a body scale factor. The central position of the body bounding box in the present disclosure may be referred to as a body position or a body central point. The body scale factor in the present disclosure may be used for determining the size of the body bounding box. The body scale factor may be a scaling factor, for example, a body scale factor s may be a scaling factor that enables a head size H in the image to be processed to be scaled to a standard size h, i.e., s=h/H. In the present disclosure the central position of the body bounding box in the image to be processed, the body scale factor, and the image to be processed can be provided to the input neural network; the image to be processed is scaled by means of the input neural network according to the body scale factor and the scaled image to be processed is cut according to the predetermined size and the central position, so as to output the image block including the body with the predetermined size.

According to one or more embodiments of the present disclosure, operation S100 may be executed by invoking, by a processor, corresponding instructions stored in a memory, and may also be executed by an image feature obtaining module 800 run by the processor.

S110, a body contour key point prediction result of the body is obtained by means of the first neural network according to the image feature.

According to one or more embodiments of the present disclosure, the first neural network in the present disclosure is obtained by using an image sample carried with body contour key point marking information for training. Under the condition of scaling and cutting the image to be processed by means of the input neural network and extracting the image feature of the image block including the body by means of the second neural network in the present disclosure, the input neural network, the first neural network, and the third neural network in the present disclosure can all be obtained by using the image sample carried with the body contour key point marking information for training. The process of training the neural network by using the image sample can be refer to the following description for FIG. 3 and FIG. 4, and is not explained in detail herein.

According to one or more embodiments of the present disclosure, the first neural network in the present disclosure would respectively form a body contour key point response diagram for at least one body contour key point regarding the input image feature. The body contour key point response diagram in the present disclosure may represent: the possibility for occurrences of a corresponding body contour key point in multiple positions (e.g. each position) in the image block. The body contour key point response diagram is an optional representation form for the body contour key point prediction result. According to one or more embodiments of the present disclosure, the number of the body contour key points is set in advance as N (N is an integer greater than 0), and thus the first neural network in the present disclosure would form N body contour key point response diagrams for the input image feature; each body contour key point response diagram corresponds to a body contour key point; different body contour key point response diagrams correspond to different body contour key points;

therefore, one body contour key point response diagram may reflect the possibility for occurrences of the body contour key point corresponding thereto in each position in the image block.

According to one or more embodiments of the present disclosure, the body contour key point response diagram output by the first neural network may be a body contour key point confidence diagram. The body contour key point confidence diagram may reflect confidence for occurrences of a corresponding body contour key point in multiple positions (e.g., each position) in the image block.

According to one or more embodiments of the present disclosure, there generally are multiple body contour key points in the present disclosure. According to one or more embodiments of the present disclosure, the number of the body contour key points is generally not less than 42, and generally no more than 115; for example, the number of the body contour key points in the present disclosure may be 64. An optional example of the distribution of the 64 body contour key points is as shown in FIG. 2.

According to one or more embodiments of the present disclosure, the body contour key point includes at least one of: a head contour key point, an arm contour key point, a hand contour key point, a shoulder contour key point, a leg contour key point, a waist contour key point, and a foot contour key point.

According to one or more embodiments of the present disclosure, the number of the head contour key points in the present disclosure is generally not less than 3, and generally no more than 8.

According to one or more embodiments of the present disclosure, the arm contour key point in the present disclosure may include: left side arm contour key points (including a left side arm inner contour key point and/or a left side arm outer contour key point) and right side arm contour key points (including a right side arm inner contour key point and/or a right side arm outer contour key point). The number of the left/right side arm contour key points is generally not less than 6, and generally no more than 18.

According to one or more embodiments of the present disclosure, the hand contour key point in the present disclosure may include: left side hand contour key points and right side hand contour key points. The number of the left/right side hand contour key points is generally not less than 2, and generally no more than 2.

According to one or more embodiments of the present disclosure, the shoulder contour key point in the present disclosure may include: left side shoulder contour key points and right side shoulder contour key points. The number of the left/right side shoulder contour key points is generally not less than 2, and generally no more than 4.

According to one or more embodiments of the present disclosure, the leg contour key point in the present disclosure may include: left side leg contour key points (including a left side leg inner contour key point and/or a left side leg outer contour key point) and right side leg contour key points (including a right side leg inner contour key point and/or a right side leg outer contour key point). The number of the left/right side leg contour key points is generally not less than 6, and generally no more than 18. The key point located at the crotch in the left side leg contour key points and the right side leg contour key points is repeated.

According to one or more embodiments of the present disclosure, the waist contour key point in the present disclosure may include: left side waist contour key points and right side waist contour key points. The number of the left/right side waist contour key points is generally not less than 2, and generally no more than 10.

According to one or more embodiments of the present disclosure, the foot contour key point in the present disclosure may include: left side foot contour key points and right side foot contour key points. The number of the left/right side foot contour key points is generally not less than 2, and generally no more than 2.

According to one or more embodiments of the present disclosure, the body contour key points in the present disclosure include:

3 head contour key points, respectively being: 1 head top key point, 1 nose tip key point, and a chin key point;

10 left side arm contour key points, respectively being: 2 left wrist contour key points (1 inner and 1 outer key points, i.e., a left wrist inner contour key point and a left wrist outer contour key point), 2 left elbow contour key point (1 inner and 1 outer key points, i.e., a left elbow inner contour key point and a left elbow outer contour key point), 2 left arm root contour key points (1 inner and 1 outer key points, i.e., a left arm root inner contour key point and a left arm root outer contour key point, where the left arm root inner contour key point is a left armpit key point), 2 lower left arm contour midpoint key points (1 inner and 1 outer key points, i.e., a lower left arm inner contour midpoint key point and a lower left outer contour midpoint key point) located at a midpoint position between the left wrist contour key points and the left elbow contour key points, and 2 upper left arm contour midpoint key points (1 inner and 1 outer key points, i.e., an upper left arm inner contour midpoint key point and an upper left arm outer contour midpoint key point) located at a midpoint position between the left elbow contour key points and the left arm root contour key points. The upper arm in the present disclosure is a brachium;

10 right side arm contour key points, respectively being: 2 right wrist contour key points (1 inner and 1 outer key points, i.e., a right wrist inner contour key point and a right wrist outer contour key point), 2 right elbow contour key point (1 inner and 1 outer key points, i.e., a right elbow inner contour key point and a right elbow outer contour key point), 2 right arm root contour key points (1 inner and 1 outer key points, i.e., a right arm root inner contour key point and a right arm root outer contour key point, where the right arm root inner contour key point is a right armpit key point), 2 lower right arm contour midpoint key points (1 inner and 1 outer key points, i.e., a lower right arm inner contour midpoint key point and a lower right outer contour midpoint key point) located at a midpoint position between the right wrist contour key points and the right elbow contour key points, and 2 upper right arm contour midpoint key points (1 inner and 1 outer key points, i.e., an upper right arm inner contour midpoint key point and an upper right arm outer contour midpoint key point) located at a midpoint position between the right elbow contour key points and the right arm root contour key points. The lower arm in the present disclosure is a forearm;

2 left side hand contour key points, respectively being: 1 left hand tip key point and 1 left palm midpoint key point;

2 right side hand contour key points, respectively being: 1 right hand tip key point and 1 right palm midpoint key point;

2 left side shoulder contour key points, respectively being: 1 left shoulder and head intersection key point located at located at an intersection position of the left side shoulder and the head, and 1 left shoulder contour midpoint key point located at a midpoint position between the left arm root contour key points and the left shoulder and head intersection key point;

2 right side shoulder contour key points, respectively being: 1 right shoulder and head intersection key point located at located at an intersection position of the right side shoulder and the head, and 1 right shoulder contour midpoint key point located at a midpoint position between the right arm root contour key points and the right shoulder and head intersection key point;

10 left side leg contour key points, respectively being: 1 crotch key point, 2 left knee contour key points (1 inner and 1 outer key points, i.e., a left knee inner contour key point and a left knee outer contour key point), 2 left ankle contour key points (1 inner and 1 outer key points, i.e., a left ankle inner contour key point and a left ankle outer contour key point), 1 left thigh root outside contour key point, 2 left shank contour midpoint key points (1 inner and 1 outer key points, i.e., a left shank inner contour midpoint key point and a left shank outer contour midpoint key point) located at a midpoint position between the left knee contour key points and the left ankle contour key points, 1 left thigh inner contour midpoint key point located at a midpoint position between the left knee inner contour key point and the crotch key point, and 1 left thigh outer contour midpoint key point located at a midpoint position between the left knee outer contour key point and the left thigh root outside contour key point;

10 right side leg contour key points, respectively being: 1 crotch key point (repeated with the crotch key point in the left side leg contour key points), 2 right knee contour key points (1 inner and 1 outer key points, i.e., a right knee inner contour key point and a right knee outer contour key point), 2 right ankle contour key points (1 inner and 1 outer key points, i.e., a right ankle inner contour key point and a right ankle outer contour key point), 1 right thigh root outside contour key point, 2 right shank contour midpoint key points (1 inner and 1 outer key points, i.e., a right shank inner contour midpoint key point and a right shank outer contour midpoint key point) located at a midpoint position between the right knee contour key points and the right ankle contour key points, 1 right thigh inner contour midpoint key point located at a midpoint position between the right knee inner contour key point and the crotch key point, and 1 right thigh outer contour midpoint key point located at a midpoint position between the right knee outer contour key point and the right thigh root outside contour key point;

5 left side waist contour key points, respectively being: 5 equal division points generated by dividing the left thing root outside contour key point and the left arm root contour key point into 6 equal parts;

5 right side waist contour key points, respectively being: 5 equal division points generated by dividing the right thing root outside contour key point and the right arm root contour key point into 6 equal parts;

2 left side foot contour key points, respectively being: 1 left tiptoe key point and 1 left heel key point;

2 right side foot contour key points, respectively being: 1 right tiptoe key point and 1 right heel key point;

The total number of the body contour key points above is 64 (removing a repeated crotch key point). As can be known by means of multiple experiments, 64 body contour key points are detected in the present disclosure without consuming excessive computing resources and time costs. As can be seen from FIG. 2 that, 64 body contour key points may accurately draw an outer contour of a body. In view of the above, the 64 body contour key points may obtain a better balance among aspects of resource consuming, instantaneity, and accuracy of drawing an outer contour of a body.

The detailed distribution of the body contour key points is only an optional example. The present disclosure does not limit the distribution condition of the body contour key points as long as the outer contour of the body can be basically drawn by means of the body contour key points. In addition, the greater the number of the body contour key points (for example, more than 64), the more accurate the body contour drawn by the body contour key points.

According to one or more embodiments of the present disclosure, operation S110 may be executed by invoking, by a processor, corresponding instructions stored in a memory, and may also be executed by a prediction result obtaining module 810 run by the processor.

S120, a body contour key point in the image block is obtained according to the body contour key point prediction result.

According to one or more embodiments of the present disclosure, according to a predetermined body contour point determining condition, information output for the first neural network can be determined, and the body contour key point in the image block can be obtained according to the determining result, so that the body contour key point in the image block is transferred into the image to be processed, thereby obtaining the body contour key point in the image to be processed. The determining condition in the present disclosure is set according to actual conditions, for example, the determining condition is set based on the body contour key point response diagram.

According to one or more embodiments of the present disclosure, for N body contour key points, the first neural network outputs N body contour key point confidence diagrams; in the present disclosure, determining may be executed for the M-th (M is greater than o and less than or equal to N) body contour key point confidence diagram according to a predetermined confidence requirement, so as to select a point meeting the predetermined confidence requirement from the body contour key point confidence diagrams, for example, in the present disclosure, the following operations may be executed for the M-th body contour key point confidence diagram according to the predetermined confidence requirement: selecting a point with the highest confidence from the M-th body contour key point confidence diagram; determining whether the point with the highest confidence is greater than a predetermined confidence threshold; if not greater than the predetermined confidence threshold, indicating that the M-th body contour key point does not exist in the image to be processed; moreover, if greater than the predetermined confidence threshold, performing mapping processing on the position of the point in the image block, so as to obtain a mapping position point of the point in the image to be processed; the mapping position point being the M-th body contour key point.

According to one or more embodiments of the present disclosure, operation S120 may be executed by invoking, by a processor, corresponding instructions stored in a memory, and may also be executed by a contour key point obtaining module 820 run by the processor.

The body contour key point obtained in the present disclosure facilitates implementing of accurate drawing of the body outer contour in the image to be processed, thereby facilitating obtaining richer body semantic information from the image including the body, so as to provide richer body semantic information for a corresponding application, for example, the body contour key point extracted from the present disclosure can be used for applications such as sticker processing, body action analysis, and body morphology analysis In the present disclosure, the body contour key point of the image to be processed is obtained by means of the first neural network, facilitating rapid and accurate obtaining of the body contour key point of the image to be processed, so as to facilitate meeting the requirement of extracting the body contour key point of the image to be processed in real time, so that the technical solution provided by the present disclosure is advantageously applied to real-time environments such as live-broadcasting or man-machine interaction.

Figure 3:
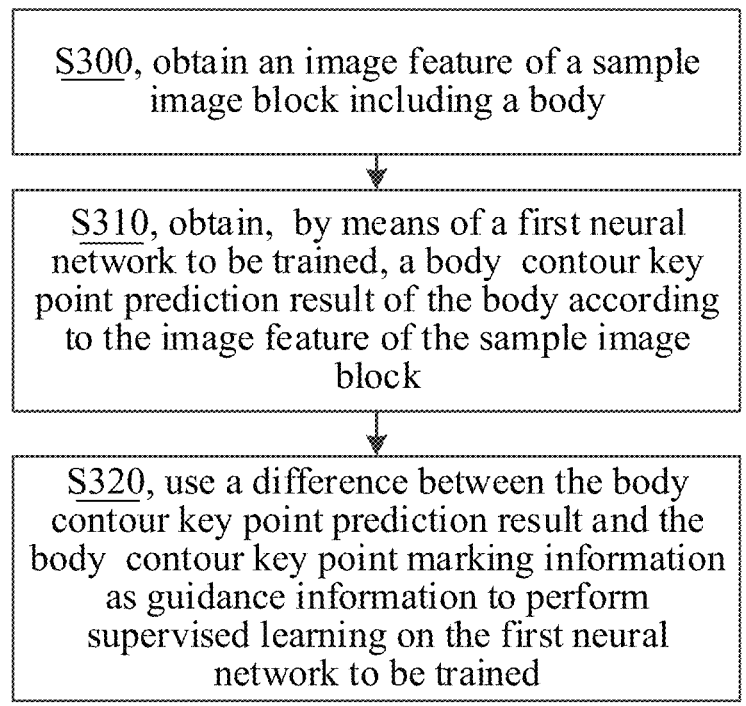
FIG. 3 illustrates a flow chart of an embodiment of a neural network training method of the present disclosure.

FIG. 3 is a flow chart of an embodiment of the neural network training method of the present disclosure. As shown in FIG. 3, the method according to the embodiments includes: operations S300, S310, and S320. Each operation in FIG. 3 is illuminated in detail as follows.

S300, the image feature of the sample image block including the body is obtained, for example, obtaining an image sample from a training data set; and obtaining an image feature of the sample image block including the body in the image sample. According to one or more embodiments of the present disclosure, the training data set in the present disclosure includes multiple image samples for training the first neural network; under a normal condition, each image sample is provided with body contour key point marking information; for example, each image sample is provided with multiple pieces of body contour key point (e.g., 64 or greater than 64 and less than or equal to 115 body contour key points etc.) marking information. In the present disclosure, one or more image samples may be read from the training data set at one time according to a random reading mode or an image sample arrangement order sequence reading mode. The method for generating the body contour key point marking information in the image sample in the training data set can be described as shown FIG. 5, and is omitted herein.

According to one or more embodiments of the present disclosure, multiple modes can be adopted to obtain the image feature of the sample image block including the body, for example, in the present disclosure, the image feature of the image block including the body in the image sample can be obtained by using the neural network. According to one or more embodiments of the present disclosure, body detection may be performed on the image sample first; then the body detection result and the image sample are provided to the input neural network to be trained to obtain a sample image block including the body with a predetermined size by means of the input neural network to be trained; and finally, the image feature of the sample image block is obtained by means of the second neural network to be trained. The body detection result may be the central position of the body bounding box and the body scale factor in the image sample.

According to one or more embodiments of the present disclosure, operation S300 may be executed by invoking, by a processor, corresponding instructions stored in a memory, and may also be executed by a first module 900 run by the processor.

S310, a body contour key point prediction result of the body is obtained by means of a first neural network to be trained according to the image feature.

According to one or more embodiments of the present disclosure, the first neural network to be trained in the present disclosure would respectively form a body contour key point response diagram for at least one body contour key point regarding the input image feature of the sample image block. According to one or more embodiments of the present disclosure, the number of the body contour key points is set in advance as N (N is an integer greater than 0), and thus the first neural network to be trained in the present disclosure would form N body contour key point response diagrams for the input image feature of the sample image block; each body contour key point response diagram corresponds to a body contour key point; different body contour key point response diagrams correspond to different body contour key points; therefore, one body contour key point response diagram may reflect the possibility for occurrences of the body contour key point corresponding thereto in each position in the sample image block.

According to one or more embodiments of the present disclosure, the body contour key point response diagram output by the first neural network to be trained may be a body contour key point confidence diagram. The body contour key point confidence diagram may reflect confidence for occurrences of a corresponding body contour key point in multiple positions (e.g., each position) in the sample image block.

According to one or more embodiments of the present disclosure, operation S310 may be executed by invoking, by a processor, corresponding instructions stored in a memory, and may also be executed by a second module 910 run by the processor.

S320, a difference between the body contour key point prediction result and the body contour key point marking information are used as guidance information to perform supervised learning on the first neural network to be trained.

According to one or more embodiments of the present disclosure, for any piece of the body contour key point marking information of the image sample, in the present disclosure, the body contour key point response diagram (e.g., the body contour key point confidence diagram) can be generated for the body contour key point marking information. For part or all of the body contour key point marking information of the image sample, in the present disclosure, one body contour key point response diagram (e.g., the body contour key point confidence diagram) can be generated respectively. Furthermore, in the present disclosure, the difference between the body contour key point response diagram (e.g., the body contour key point confidence diagram) output by the first neural network to be trained and the generated body contour key point response diagram (e.g., the body contour key point confidence diagram) as the guidance information to perform supervised learning on the first neural network to be trained.

According to one or more embodiments of the present disclosure, the N (e.g., 64) body contour key point confidence diagrams output by the first neural network to be trained for N (e.g., 64) body contour key points are respectively: a first output body contour key point confidence diagram, a second output body contour key point confidence diagram, . . . , and an N-th output body contour key point confidence diagram; the N (e.g., 64) body contour key point confidence diagrams generated by the present disclosure for N (e.g., 64) pieces of body contour key point marking information of the image same are respectively: a first generated body contour key point confidence diagram, a second generated body contour key point confidence diagram, . . . , and an N-th generated body contour key point confidence diagram; the difference between the first output body contour key point confidence diagram and the first generated body contour key point confidence diagram, the difference between the second output body contour key point confidence diagram and the second generated body contour key point confidence diagram, ..., and the N-th output body contour key point confidence diagram and the N-th generated body contour key point confidence diagram, as the guidance information to perform supervised learning on the first neural network to be trained.

According to one or more embodiments of the present disclosure, the body contour key point confidence diagram can be generated by multiple means, for example, for any piece of body contour key point marking information of the image sample, the position thereof in the sample image block is first determined according to the body contour key point marking information; then, a Gaussian response is formed in a predetermined peripheral region of the position (e.g., an X×Y using the position as the center, and e.g., the entire image block region), so that the body contour key point confidence diagram corresponding to the body contour key point marking information can be obtained according to the Gaussian response. Using the method above, in the present disclosure, for each body contour key point marking information of the image sample, a body contour key point confidence diagram with a size equal to that of the sample image block can be generated respectively. In addition, in the present disclosure, other modes can also be adopted to generate the body contour key point confidence diagram, for example, setting the position in the sample image corresponding to the body contour key point marking information as 1, while setting other positions as 0, thereby obtaining a body contour key point confidence diagram. The present disclosure does not limit the implementing mode of generating the body contour key point confidence diagram.

According to one or more embodiments of the present disclosure, according to a predetermined body contour point determining condition, information output for the first neural network to be trained can be determined, and the body contour key point in the sample image block can be obtained according to the determining result, so that the body contour key point in the sample image block is transferred into the image sample in the present disclosure, thereby obtaining the body contour key point in the image sample. Then in the present disclosure, for the purpose of reducing the difference between the obtained body contour key point in the image sample and the body contour key point marking information of the image sample, the network parameter (e.g., weight) in the first neural network to be trained can be adjusted to perform supervised learning on the first neural network to be trained.

According to one or more embodiments of the present disclosure, when the training for the first neural network to be trained meets a predetermined iteration condition, this training process ends. The predetermined iteration condition in the present disclosure may include: the difference between the information output by the first neural network to be trained and the body contour key point marking information of the image sample meets a predetermined difference requirement. When the difference meets the predetermined difference requirement, this training for the first neural network to be trained successfully ends. The predetermined iteration condition in the present disclosure may also include: training the first neural network to be trained, the number of used image samples meeting a predetermined number requirement, etc. Under the condition that the number of used image samples meets the predetermined number requirement but the difference does not meet the predetermined difference condition, this training for the first neural network to be trained does not succeed. The first neural network with the successfully completed training may be used for performing body contour key point detection processing on the image feature of the image block including the body in the image to be processed.

According to one or more embodiments of the present disclosure, operation S320 may be executed by invoking, by a processor, corresponding instructions stored in a memory, and may also be executed by a third module 920 run by the processor.

Figure 4:
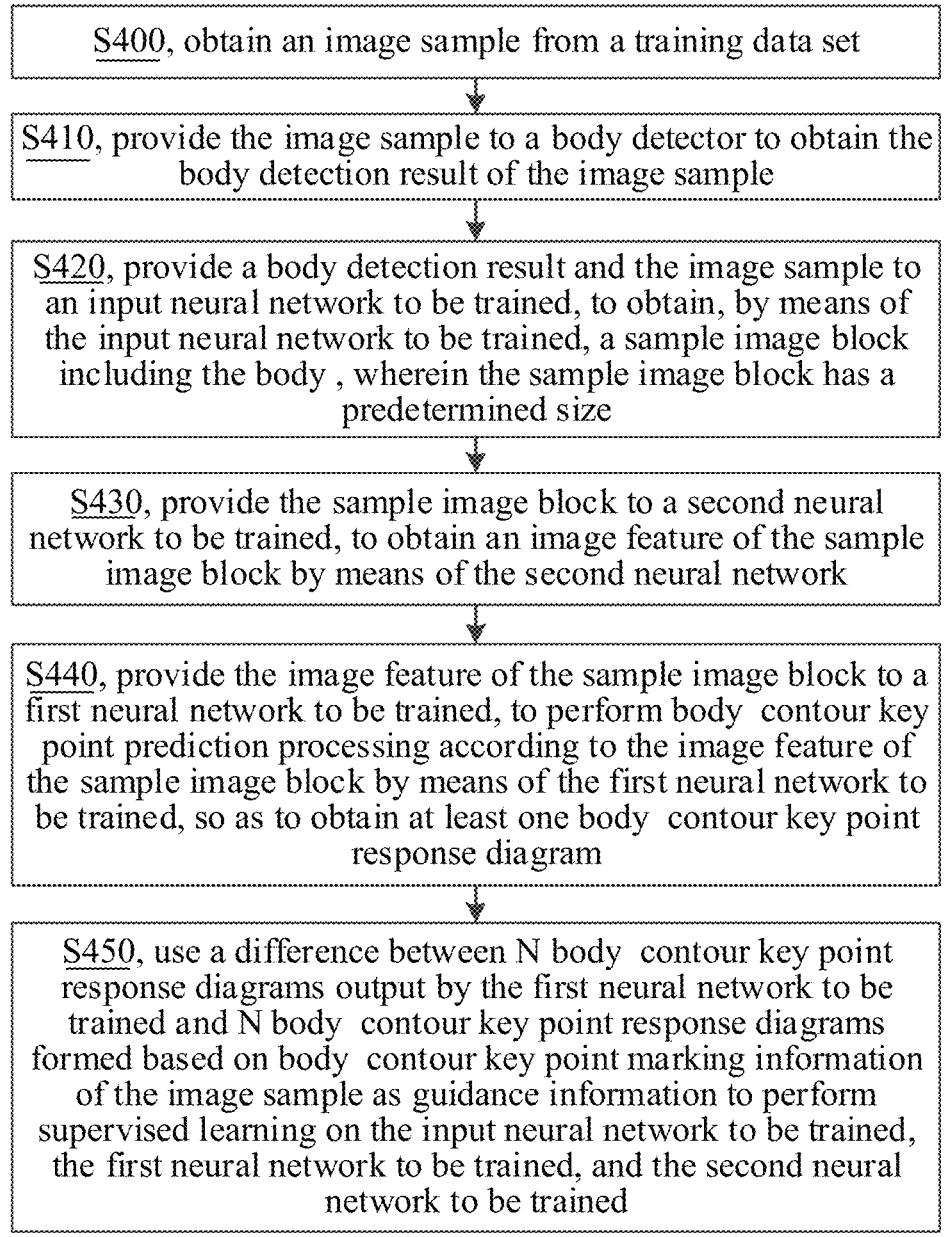
FIG. 4 illustrates a flow chart of another embodiment of the neural network training method of the present disclosure.

FIG. 4 is a flow chart of another embodiment of the neural network training method of the present disclosure. As shown in FIG. 4, the method according to the embodiments includes: operations S400, S410, S420, S430, S440, and S450. Each operation in FIG. 4 is illuminated as follows.

S400, an image sample is obtained from a training data set. The image sample in the present disclosure may be described as in operation S300 above.

S410, the image sample is provided to a body detector to obtain the body detection result of the image sample. According to one or more embodiments of the present disclosure, the body detector can be used to obtain the central position of the body bounding box and the body scale factor in the image sample.

S420, a body detection result and the image sample are provided to an input neural network to be trained, to obtain a sample image block including the body with a predetermined size by means of the input neural network to be trained.

According to one or more embodiments of the present disclosure, the input neural network to be trained may determine, according to the central position of the body bounding box and the body scale factor in the input image sample, the size and position of the body bounding box in the image sample, so that the input neural network to be trained may cut the input image sample to obtain the sample image block according to the size and position of the body bounding box and output the sample image block.

S430, the sample image block is provided to the second neural network to be trained, to obtain the image feature of the sample image block by means of the second neural network. The structure of the second neural network to be trained and the like may refer to related description in the method embodiments above, and are not repeatedly explained herein.

According to one or more embodiments of the present disclosure, operations S400, S410, S420, and S430 may be executed by invoking, by a processor, corresponding instructions stored in a memory, and may also be executed by the first module 900 run by the processor.

S440, the image feature of the sample image block is provided to the first neural network to be trained, to perform body contour key point prediction processing according to the image feature of the sample image block by means of the first neural network to be trained, so as to obtain at least one body contour key point response diagram.

According to one or more embodiments of the present disclosure, for the input image feature of the sample image block, the first neural network to be trained may respectively output a body contour key point confidence diagram for each body contour key point, i.e., each output body contour key point confidence diagram corresponds to one different body contour key point; one body contour key point confidence diagram may represent: the confidence for the occurrence of each position of the body contour key point corresponding thereto in the sample image block.

According to one or more embodiments of the present disclosure, operation S440 may be executed by invoking, by a processor, corresponding instructions stored in a memory, and may also be executed by the second module 910 run by the processor.

S450, the difference between the N body contour key point response diagrams output by the first neural network to be trained and the N body contour key point response diagrams formed based on the body contour key point marking information of the image sample is used as the guidance information to perform supervised learning on the input neural network to be trained, the first neural network to be trained, and the second neural network to be trained.

According to one or more embodiments of the present disclosure, for any piece of body contour key point marking information of the image sample, the position thereof in the sample image block can be first determined according to the body contour key point marking information; then, a Gaussian response is formed in a predetermined peripheral region of the position (e.g., an X×Y using the position as the center, and e.g., the entire image block region), so that the body contour key point confidence diagram corresponding to the body contour key point marking information can be obtained according to the Gaussian response. Using the method above, in the present disclosure, for each body contour key point marking information of the image sample, a body contour key point confidence diagram with a size equal to that of the sample image block can be generated respectively. In this way, in the present disclosure, according to the difference between the body contour key point confidence diagram output by the first neural network for each body contour key point and the generated corresponding body contour key point confidence diagram being used as the guiding information, supervised learning is performed on the input neural network to be trained, the first neural network to be trained, and the second neural network to be trained That is to say, in the present disclosure, for the purpose of reducing the difference between the generated body contour key point confidence diagram and the body contour key point confidence diagram output by the first neural network to be trained, supervised learning can be performed on the network parameters (e.g., weight) in the input neural network to be trained, the first neural network to be trained, and the second neural network to be trained.

When the training for the input neural network to be trained, the first neural network to be trained, and the second neural network to be trained meets the predetermined iteration condition (e.g., the difference meets the predetermined difference requirement or the number of the used image samples meets the predetermined number requirement), this training process ends. When the training process ends, if the difference between the information output by the first neural network to be trained and the body contour key point marking information of the image sample meets the predetermined difference requirement, this training for the input neural network to be trained, the first neural network to be trained, and the second neural network to be trained completes successfully; or this training for the input neural network to be trained, the first neural network to be trained, and the second neural network to be trained does not succeed.

According to one or more embodiments of the present disclosure, operation S450 may be executed by invoking, by a processor, corresponding instructions stored in a memory, and may also be executed by the third module 920 run by the processor.

Figure 5:
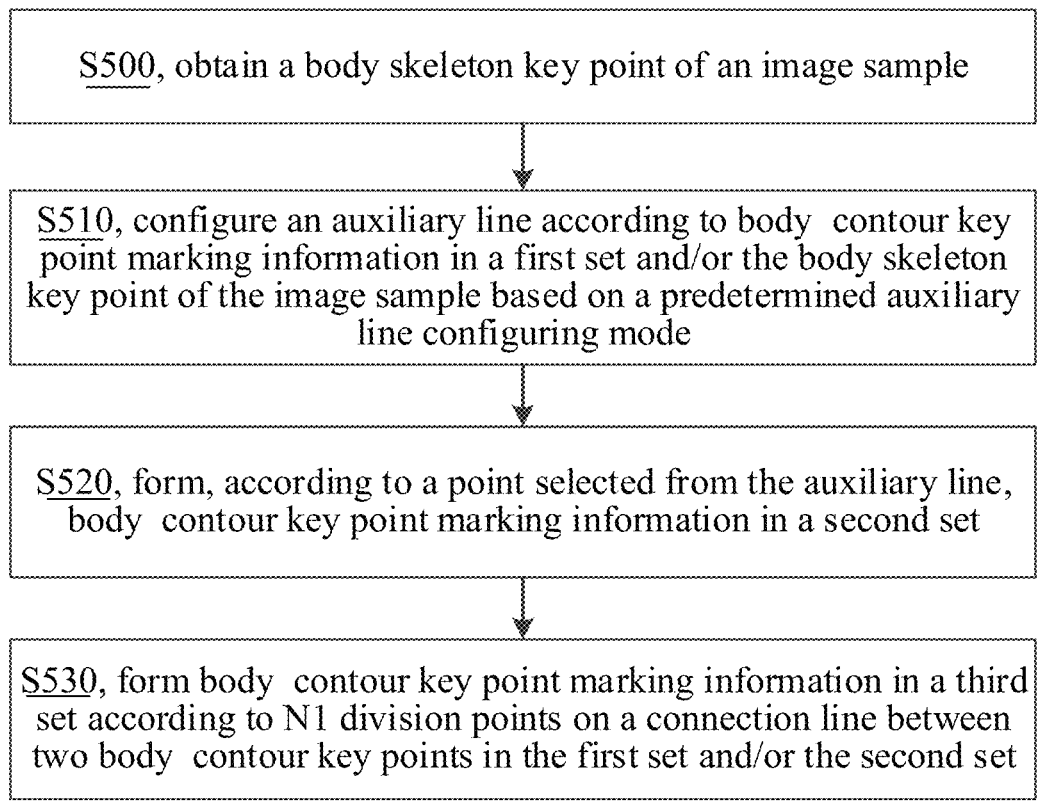
FIG. 5 illustrates a flow chart of an embodiment of a body contour key point marking information generating method of an image sample of the present disclosure.

FIG. 5 is a flow chart of an embodiment of a body contour key point marking information generating method of an image sample of the present disclosure. As shown in FIG. 5, the method according to the embodiments includes: operations S500, S510, and S520. According to one or more embodiments of the present disclosure, the method according to the embodiments further includes: operation S530. Each operation in FIG. 5 is illuminated as follows.

S500, a body skeleton key point of the image sample is obtained.

According to one or more embodiments of the present disclosure, multiple modes can be used to obtain the body skeleton key point of the image sample; According to one or more embodiments of the present disclosure, the image sample is first provided to the body detector to obtain a body detection result of the image sample, for example, obtaining the central position of the body bounding box and the body scale factor in the image sample; then the body detection result of the image sample and the image sample are provided to the input neural network, to obtain the sample image block including the body in the image sample by means of the input neural network; then, the sample image block is provided to the body skeleton detection module to obtain the body skeleton key point in the sample image block by means of the body skeleton detection module.

According to one or more embodiments of the present disclosure, the body skeleton key point in the present disclosure is generally located at a central position of a body joint. Using the body skeleton key point cannot draw the body outer contour. According to one or more embodiments of the present disclosure, the body skeleton key point obtained by the present disclosure includes: a right shoulder key point, a right elbow key point, a right wrist key point, a left shoulder key point, a left elbow key point, a left wrist key point, a right hip key point, a right knee key point, a right ankle key point, a left hip key point, a left knee key point, a left ankle key point, a head top key point, a neck key point, etc. The present disclosure does not limit the number of the body skeleton key points and the implementing mode for obtaining the body skeleton key points.

S510, an auxiliary line is configured according to the body contour key point marking information in the first set and/or the body skeleton key point of the image sample based on a predetermined auxiliary line configuring mode.

According to one or more embodiments of the present disclosure, the body contour key point marking information may include the serial number and position coordinate of the body contour key point. An image sample may include multiple sets; different sets may correspond to different marking difficulties; the body contour key point marking information in a set with a high marking difficulty may be formed based on the body contour key point marking information in a set with a low marking difficulty. High and low marking difficulties in the present disclosure can be distinguished based on whether the position of the body contour key point is easy to be accurately determined. The marking difficulty for the body contour key point marking information in the first set of the image sample in the present disclosure is generally the lowest, i.e., the body contour key point marking information that would be accurately determined in an easiest manner is configured in the first set. The body contour key point marking information in the first set can be formed by means of manual marking in the present disclosure.

According to one or more embodiments of the present disclosure, the body contour key point marking information in the first set may include:

head contour key point marking information, such as 1 piece of head top key point marking information, 1 piece of nose tip key point marking information, and 1 piece of chin key point marking information;

left side hand contour key point marking information, such as 1 piece of left hand tip key point marking information and 1 piece of left palm midpoint key point marking information;

right side hand contour key point marking information, such as 1 piece of right hand tip key point marking information and 1 piece of right palm midpoint key point marking information;

left side wrist contour key point marking information (1 inner and 1 outer pieces of information), left elbow contour key point marking information (1 inner and 1 outer pieces of information), and 1 piece of left arm root inner contour key point marking information (i.e., left armpit contour key point marking information) in left side arm contour key point marking information;

right side wrist contour key point marking information (1 inner and 1 outer pieces of information), right elbow contour key point marking information (1 inner and 1 outer pieces of information), and 1 piece of right arm root inner contour key point marking information (i.e., right armpit contour key point marking information) in right side arm contour key point marking information;

1 piece of left shoulder and head intersection key point marking information in left side shoulder contour key point marking information;

1 piece of right shoulder and head intersection key point marking information in right side shoulder contour key point marking information;

1 pieces of crotch key point marking information, left knee contour key point marking information (1 inner and 1 outer pieces of information), and left ankle contour key point marking information (1 inner and 1 outer pieces of information) in left side leg contour key point marking information;

1 pieces of crotch key point marking information (repeated), right knee contour key point marking information (1 inner and 1 outer pieces of information), and right ankle contour key point marking information (1 inner and 1 outer pieces of information) in right side leg contour key point marking information;

left side foot contour key point marking information, such as 1 piece of left tiptoe key point marking information and 1 piece of left heel key point marking information;

right side foot contour key point marking information, such as 1 piece of right tiptoe key point marking information and 1 piece of right heel key point marking information.

According to one or more embodiments of the present disclosure, the configuring mode for the predetermined auxiliary line generally includes: disposing a vertical line vertical to a connection line between two body skeleton key points by means of a body contour key point.

In a first optional example, a connection line (referred to as a first connection line hereinafter) between the left shoulder key point and the left elbow key point in the body skeleton key points is made; by means of the left armpit key point in the first set, a vertical line (referred to as a first vertical line hereinafter) of the first connection line is configured; the first vertical line is an auxiliary line in the present disclosure. Similarly, a connection line (referred to as a second connection line hereinafter) between the right shoulder key point and the right elbow key point in the body skeleton key points is made; by means of the right armpit key point in the first set, a vertical line (referred to as a second vertical line hereinafter) of the second connection line is configured; the second vertical line is an auxiliary line in the present disclosure.

In a second optional example, a connection line (referred to as a third connection line hereinafter) between the left hip key point and the left knee key point in the body skeleton key points is made; by means of the crotch key point in the first set, a vertical line (referred to as a third vertical line hereinafter) of the third connection line is configured; the third vertical line is an auxiliary line in the present disclosure. Similarly, a connection line (referred to as a fourth connection line hereinafter) between the right hip key point and the right knee key point in the body skeleton key points is made; by means of the crotch key point in the first set, a vertical line (referred to as a fourth vertical line hereinafter) of the fourth connection line is configured; the fourth vertical line is an auxiliary line in the present disclosure.

According to one or more embodiments of the present disclosure, operation S510 may be executed by invoking, by a processor, corresponding instructions stored in a memory, and may also be executed by a body contour key point detection apparatus 1000 run by the processor.

S520, body contour key point marking information in a second set is formed according to a point selected from the auxiliary line.

According to one or more embodiments of the present disclosure, the marking difficulty for the body contour key point marking information in the second set of the image sample of the present disclosure is generally higher than that in the first set. The body contour key point marking information in the second set is generally formed based on the body contour key point marking information in the first set. The body contour key point marking information in the second set can be formed by means of selecting a point from the auxiliary line, for example, selecting an intersection point, in the present disclosure. Forming the body contour key point marking information in the second set by means of making an auxiliary line and selecting a point from the auxiliary line facilitates improving the accuracy and consistence of the body contour key point marking information in the second set.

According to one or more embodiments of the present disclosure, an intersection point between the first vertical line and the body outer contour in the sample image block can be used as the left arm root outer contour key point, and the position coordinate of the left arm root outer contour key point in the sample image block is converted to the position coordinate in the image sample, so that the left arm root outer contour key point marking information in the second set can be formed according to the serial number of the left arm root outer contour key point and the position coordinate thereof in the image sample. This mode facilitates improving the accuracy and consistence of the left arm root outer contour key point marking information According to one or more embodiments of the present disclosure, an intersection point between the second vertical line and the body outer contour in the sample image block can be used as the right arm root outer contour key point, and the position coordinate of the right arm root outer contour key point in the sample image block is converted to the position coordinate in the image sample, so that the right arm root outer contour key point marking information in the second set can be formed according to the serial number of the right arm root outer contour key point and the position coordinate thereof in the image sample. This mode facilitates improving the accuracy and consistence of the right arm root outer contour key point marking information According to one or more embodiments of the present disclosure, an intersection point between the third vertical line and the body outer contour in the sample image block can be used as the left thigh root outer contour key point, and the position coordinate of the left thigh root outer contour key point in the sample image block is converted to the position coordinate in the image sample, so that the left thigh root outer contour key point marking information in the second set can be formed according to the serial number of the left thigh root outer contour key point and the position coordinate thereof in the image sample. This mode facilitates improving the accuracy and consistence of the left thigh root outer contour key point marking information According to one or more embodiments of the present disclosure, an intersection point between the fourth vertical line and the body outer contour in the sample image block can be used as the right thigh root outer contour key point, and the position coordinate of the right thigh root outer contour key point in the sample image block is converted to the position coordinate in the image sample, so that the right thigh root outer contour key point marking information in the second set can be formed according to the serial number of the right thigh root outer contour key point and the position coordinate thereof in the image sample. This mode facilitates improving the accuracy and consistence of the right thigh root outer contour key point marking information According to one or more embodiments of the present disclosure, operations S300, S510, and S520 may be executed by invoking, by a processor, corresponding instructions stored in a memory, and may also be executed by a first marking module 930 run by the processor.

S530, body contour key point marking information in a third set is formed according to N1 division points on a connection line between two body contour key points in the first set and/or the second set.

According to one or more embodiments of the present disclosure, the marking difficulty for the body contour key point marking information in the third set of the image sample of the present disclosure is generally higher than that in the first set. However, the marking difficulty in the third set would not necessarily be higher than that in the second set. According to one or more embodiments of the present disclosure, the body contour key point marking information in the present disclosure may be marking information of N1 division points on the connection line between two body contour key points in the first set, may also be marking information of N1 division points on the connection line between two body contour key points in the second set, and may further be marking information of N1 division points on the connection line between one body contour key point in the first set and one body contour key point in the second set. The N1 division points in the present disclosure generally are N1 even division points; the N1 even division points are N1 equal division points; and N1 is an integer greater than 1, for example, 2 equal division points (i.e., a middle point), 5 equal division points, or 6 equal division points.

According to one or more embodiments of the present disclosure, a middle point on the connection line between the left wrist inner contour key point and the left elbow inner contour key point can be used as the lower left arm inner contour midpoint key point and the lower left arm inner contour midpoint key point marking information in the third set is formed. In the present disclosure, a midpoint point on the connection line between the left wrist outer contour key point and the left elbow outer contour key point can be used as the lower left arm outer contour midpoint key point and the lower left arm outer contour midpoint key point marking information in the third set is formed.

According to one or more embodiments of the present disclosure, a middle point on the connection line between the right wrist inner contour key point and the right elbow inner contour key point can be used as the lower right arm inner contour midpoint key point and the lower right arm inner contour midpoint key point marking information in the third set is formed. In the present disclosure, a middle point on the connection line between the right wrist outer contour key point and the right elbow outer contour key point can be used as the lower right arm outer contour midpoint key point and the lower right arm outer contour midpoint key point marking information in the third set is formed.

According to one or more embodiments of the present disclosure, a middle point on the connection line between the left elbow inner contour key point and the left arm root inner contour key point (i.e., the left armpit key point) can be used as the upper left arm inner contour midpoint key point and the upper left arm inner contour midpoint key point marking information in the third set is formed. In the present disclosure, a middle point on the connection line between the left elbow outer contour key point and the left arm root outer contour key point can be used as the upper left arm outer contour midpoint key point and the upper left arm outer contour midpoint key point marking information in the third set is formed.

According to one or more embodiments of the present disclosure, a middle point on the connection line between the right elbow inner contour key point and the right arm root inner contour key point (i.e., the right armpit key point) can be used as the upper right arm inner contour midpoint key point and the upper right arm inner contour midpoint key point marking information in the third set is formed. In the present disclosure, a middle point on the connection line between the right elbow outer contour key point and the right arm root outer contour key point can be used as the upper right arm outer contour midpoint key point and the upper right arm outer contour midpoint key point marking information in the third set is formed.

According to one or more embodiments of the present disclosure, a middle point on the connection line between the left arm root outer contour key point and the left shoulder and head intersection key point can be used as the left shoulder contour midpoint key point and the left shoulder contour midpoint key point marking information in the third set is formed.

According to one or more embodiments of the present disclosure, a middle point on the connection line between the right arm root outer contour key point and the right shoulder and head intersection key point can be used as the right shoulder contour midpoint key point and the right shoulder contour midpoint key point marking information in the third set is formed.

According to one or more embodiments of the present disclosure, a middle point on the connection line between the left knee inner contour key point and the left ankle inner contour key point can be used as the left shank inner contour midpoint key point and the left shank inner contour midpoint key point marking information in the third set is formed. In the present disclosure, a middle point on the connection line between the left knee outer contour key point and the left ankle outer contour key point can be used as the left shank outer contour midpoint key point and the left shank outer contour midpoint key point marking information in the third set is formed.

According to one or more embodiments of the present disclosure, a middle point on the connection line between the right knee inner contour key point and the right ankle inner contour key point can be used as the right shank inner contour midpoint key point and the right shank inner contour midpoint key point marking information in the third set is formed. In the present disclosure, a middle point on the connection line between the right knee outer contour key point and the right ankle outer contour key point can be used as the right shank outer contour midpoint key point and the right shank outer contour midpoint key point marking information in the third set is formed.

According to one or more embodiments of the present disclosure, a middle point on the connection line between the left knee inner contour key point and the left thigh root inner contour key point (i.e., the crotch key point) can be used as the left thigh inner contour midpoint key point and the left thigh inner contour midpoint key point marking information in the third set is formed. In the present disclosure, a middle point on the connection line between the left knee outer contour key point and the left thigh root outer contour key point can be used as the left shank outer contour midpoint key point and the left shank outer contour midpoint key point marking information in the third set is formed.

According to one or more embodiments of the present disclosure, i a middle point on the connection line between the right knee inner contour key point and the right thigh root inner contour key point (i.e., the crotch key point) can be used as the right thigh inner contour midpoint key point and the right thigh inner contour midpoint key point marking information in the third set is formed. In the present disclosure, a middle point on the connection line between the right knee outer contour key point and the right thigh root outer contour key point can be used as the right shank outer contour midpoint key point and the right shank outer contour midpoint key point marking information in the third set is formed.

According to one or more embodiments of the present disclosure, the connection line between the left thigh root outside contour key point and the left arm root contour key point (i.e., the left armpit key point) can be divided into 6 equal parts, thereby generating 5 equal division points; in the present disclosure, 5 equal division points can be used as 5 left side waist contour key points and 5 pieces of the left side waist contour key point marking information are formed in the third set.

According to one or more embodiments of the present disclosure, the connection line between the right thigh root outside contour key point and the right arm root contour key point (i.e., the right armpit key point) can be divided into 6 equal parts, thereby generating 5 equal division points; in the present disclosure, 5 equal division points can be used as 5 right side waist contour key points and 5 pieces of the right side waist contour key point marking information are formed in the third set.

According to one or more embodiments of the present disclosure, operation S530 may be executed by invoking, by a processor, corresponding instructions stored in a memory, and may also be executed by a second marking module 940 run by the processor.

Figure 6:
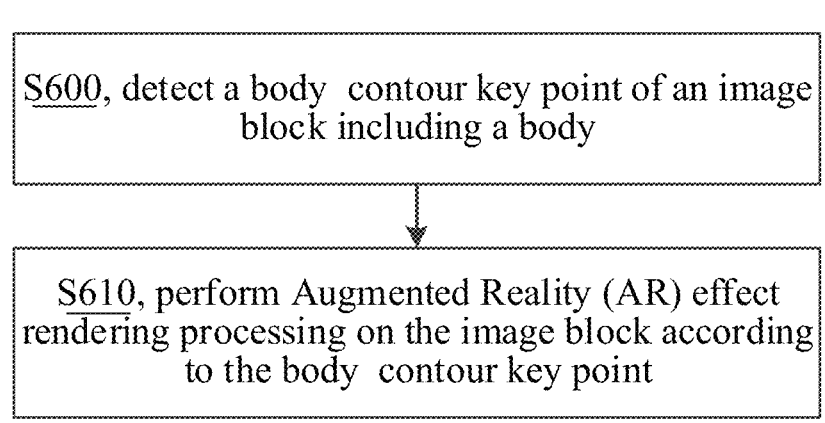
FIG. 6 illustrates a flow chart of an embodiment of an image processing method of the present disclosure.

FIG. 6 is a flow chart of an embodiment of an image processing method of the present disclosure. As shown in FIG. 6, the method according to the embodiments includes: operations S600 and S610. Each operation in FIG. 6 is illuminated as follows.

S600, the body contour key point of the image block including the body is detected. The body contour key point in the present disclosure is used for representing an outer contour of the body. In the present disclosure, detecting the body contour key point can be executed by using each operation shown in FIG. 1. Descriptions are not made herein repeatedly.

According to one or more embodiments of the present disclosure, operation S600 may be executed by invoking, by a processor, corresponding instructions stored in a memory, and may also be executed by a body contour key point detection apparatus 1000 run by the processor.

S610, an Augmented Reality (AR) effect rendering processing is performed on the image block according to the body contour key point.

According to one or more embodiments of the present disclosure, in the present disclosure, the position relation between the body contour key point of the image block and the sticker material can be determined first, and then, according to the position relation and based on the sticker material, the AR effect rendering processing is performed on the image block. According to one or more embodiments of the present disclosure, first, a first interface function used for creating a sticker handle is invoked to create the sticker handle; next, a second interface function used for reading the sticker material is invoked to store a sticker material compressed package into a memory by means of reading and to analyze, thereby obtaining information required for rendering, such as, the body contour key point, the playback triggering condition of the sticker material, the playback state parameter of the sticker material according to analysis; and then a third interface function used for rendering the sticker material is invoked to determine a position relation between the body contour key point of the image block and the sticker material according to an analysis result and to perform the AR effect rendering on the sticker material compressed package stored into the memory by means of reading on the image block based on the sticker handle according to the analysis result and the position relation. After rendering is completed, the sticker handle is destroyed.

According to one or more embodiments of the present disclosure, the playback state parameter of the sticker material in the present disclosure may include: a layer where playback is located, a loop playback parameter, and zooming in/out playback. The AR effect in the present disclosure may be a clothing effect (e.g., a clothing changing effect), an accessory effect (e.g., an accessory wearing effect), an advertisement effect, a 2D/3D special effect, etc. The present disclosure does not limit the content included in the playback state parameter and the representation form of the AR effect.

According to one or more embodiments of the present disclosure, operation S610 may be executed by invoking, by a processor, corresponding instructions stored in a memory, and may also be executed by a rendering module 1010 run by the processor.

Figure 7:
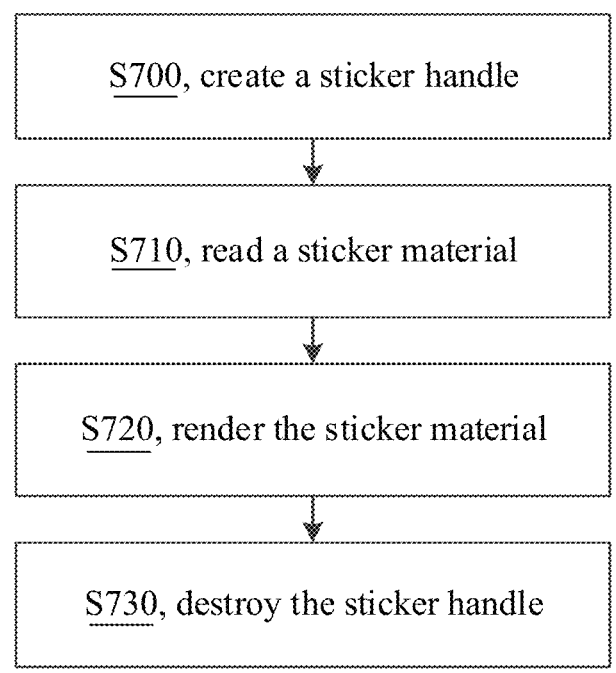
FIG. 7 illustrates a flow chart of an embodiment of sticker processing performed on an image to be processed of the present disclosure.

FIG. 7 is a flow chart of an embodiment of sticker processing performed on an image to be processed of the present disclosure. As shown in FIG. 7, the method according to the embodiments includes: operations S700, S710, S720, S730, S740, and S750. Each operation in FIG. 7 is illuminated as follows.

S700, a sticker handle is created.

According to one or more embodiments of the present disclosure, the creation of the sticker handle can be implemented by invoking an interface function for creating the sticker handle. A corresponding storage space is reserved for the created sticker handle, so as to store the video frame and the sticker material. In addition, the sticker handle can be created in a non-Graphics Library (non-GL) environment in the present disclosure. The created sticker handle in the present disclosure may be the sticker handle that creates a resource in the GL based on delay; that is to say, if the created sticker handle needs to use the resource in the GL, a strategy of creating when using the resource can be adopted, for example, before the first rendering, creating a corresponding resource in the GL environment.

S710, the sticker material is read.

According to one or more embodiments of the present disclosure, i the reading of the sticker material can be implemented by invoking the interface function for reading the sticker material, for example, providing path information of the sticker material to the interface function, reading the corresponding sticker material compressed package in the memory, and analyzing the file in the compressed package in the memory. The sticker material compressed package generally includes a json file; analysis of the json file may obtain information of the sticker material such as the number and size of pictures of the sticker material (for example, a 2D sticker and the like) in the sticker material compressed package, so as to facilitate reading of the sticker material on one hand, and may obtain position relations between different sticker materials and the body contour key point and a triggering action of the sticker materials on the other hand. Sticker material rendering information such as the sticker materials, the position relations, and the triggering actions can be stored in the created sticker handle in the present disclosure.

According to one or more embodiments of the present disclosure, the frame number requiring to be rendered can be obtained according to the sticker rendering information in the sticker handle, and the corresponding video frame is read in advance. In the present disclosure, a resource reading thread can be opened by means of a background to complete the operation of reading the video frame.

S720, the sticker material is rendered.

According to one or more embodiments of the present disclosure, the rendering of the sticker material can be implemented by invoking an interface function for rendering the sticker material. For example, the interface function may determine, according to the sticker material rendering information and the detected action in the video frame, whether requiring to render a corresponding sticker material in the video frame (for example, whether the action in the video frame belongs to a respective triggering action for each sticker material, etc.); and under the condition that it is determined that the corresponding sticker material is required to be rendered in the video frame, the sticker material enters a playback state; in the present disclosure, the corresponding sticker material can be displayed on a corresponding position in a certain amount of video frames according to information such as the position relation between the sticker material and the body contour key point. According to one or more embodiments of the present disclosure, a position matrix of the sticker materials in the playback state can be calculated, and stored in the sticker handle; during displaying, the corresponding sticker material can be first transferred as an image texture in a video memory, to facilitate processing by a display processor; then according to the obtained position matrix, the position of the image texture in the video frame is determined and rendered.

S730, the sticker handle is destroyed.

According to one or more embodiments of the present disclosure, the created sticker handle can be destroyed by invoking the interface function for destroying the sticker handle under the condition that no continuous rendering of the sticker material is required, so as to release a corresponding resource occupied by a feature handle.

According to one or more embodiments of the present disclosure, operations S700, S710, S720, and S730 may be executed by invoking, by a processor, corresponding instructions stored in a memory, and may also be executed by a rendering module 1010 run by the processor.

Any method provided by the embodiments of the present disclosure is executed by any appropriate device having data processing capability, including, but not limited to, a terminal device and a server. Alternatively, any method provided in the embodiments of the present disclosure is executed by a processor, for example, any method mentioned in the embodiments of the present disclosure is executed by the processor by invoking a corresponding instruction stored in a memory. Details are not described below again.

A person of ordinary skill in the art may understand that all or some operations for implementing the foregoing method embodiments are achieved by a program by instructing related hardware; the foregoing program can be stored in a computer-readable storage medium; when the program is executed, operations including the foregoing method embodiments are executed. Moreover, the foregoing storage medium includes various media capable of storing a program code such as an ROM, an RAM, a magnetic disk, or an optical disk.

Figure 8:
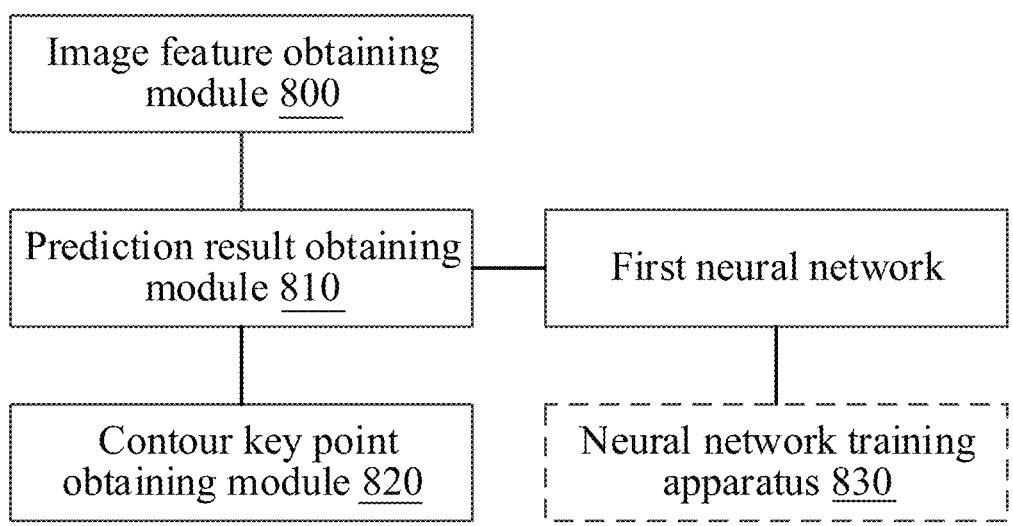
FIG. 8 illustrates a structural schematic diagram of an embodiment of a body contour key point detection apparatus of the present disclosure.

FIG. 8 is a structural schematic diagram of an embodiment of a body contour key point detection apparatus of the present disclosure. As shown in FIG. 8, the apparatus according to the embodiments mainly includes: an image feature obtaining module 800, a prediction result obtaining module 810, and a contour key point obtaining module 820. According to one or more embodiments of the present disclosure, the apparatus may further include a neural network training apparatus 830.

The image feature obtaining module 800 is mainly configured to obtain an image feature of an image block including a body. Please refer to the description for operation S100 in FIG. 1 for the method embodiment above for the operation executed by the image feature obtaining module 800. Descriptions are not made herein repeatedly.

The prediction result obtaining module 810 is mainly configured to obtain a body contour key point prediction result of the body by means of a first neural network according to the image feature obtained by the image feature obtaining module 800. Please refer to the description for operation S110 in FIG. 1 for the method embodiment above for the operation executed by the prediction result obtaining module 810. Descriptions are not made herein repeatedly.

The contour key point obtaining module 820 is mainly configured to obtain a body contour key point in the image block according to the body contour key point prediction result. The body contour key point is used for representing an outer contour of the body. Please refer to the description for operation S120 in FIG. 1 for the method embodiment above for the operation executed by the contour key point obtaining module 820. Descriptions are not made herein repeatedly.

The neural network training apparatus 830 is mainly configured to train the first neural network. The neural network training apparatus 830 may also be configured to train the input neural network and the second neural network. The neural network training apparatus 830 may further be configured to mark the image sample. Please refer to the descriptions for FIG. 3 to FIG. 5 for the method embodiment above for the operations executed by the neural network training apparatus 830. Please refer to the description for FIG. 9 for the embodiment below for the structure of the neural network training apparatus 830. Descriptions are not made herein repeatedly.

Figure 9:
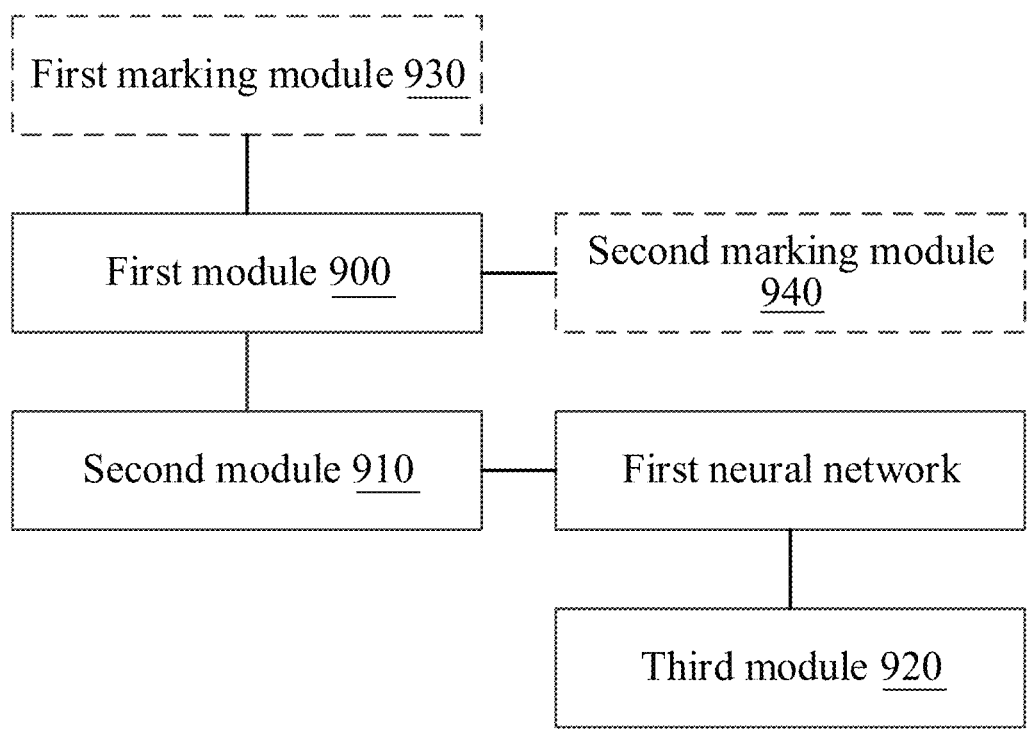
FIG. 9 illustrates a structural schematic diagram of an embodiment of a neural network training apparatus of the present disclosure.

FIG. 9 is a structural schematic diagram of an embodiment of a neural network training apparatus of the present disclosure. As shown in FIG. 9, the apparatus according to the embodiments mainly includes: a first module 900, a second module 910, and a third module 920. According to one or more embodiments of the present disclosure, the apparatus may further include: a first marking module 930 and a second marking module 940.

The first module 900 is mainly configured to obtain an image feature of a sample image block including a body.

According to one or more embodiments of the present disclosure, the first module 900 includes a detection sub-module, a first obtaining sub-module, and a second obtaining sub-module. The detection sub-module is mainly configured to perform body detection on the image sample. The first obtaining sub-module is mainly configured to provide a body detection result and the image sample to an input neural network to be trained, to obtain a sample image block including the body with a predetermined size by means of the input neural network to be trained. The second obtaining sub-module is mainly configured to obtain the image feature of the sample image block using a second neural network to be trained. Please refer to the descriptions for operation S300 in FIG. 3 and operations S400, S410, S420, and S430 in FIG. 4 for the method embodiment above for the operations executed by the first module 900 and each sub-module included therein. Descriptions are not made herein repeatedly.

The second module 910 is mainly configured to obtain a body contour key point prediction result of the body by means of a first neural network to be trained according to the image feature. Please refer to the descriptions for operation S310 in FIG. 3 and operation S440 in FIG. 4 for the method embodiment above for the operations executed by the second module 910. Descriptions are not made herein repeatedly.

The third module 920 is mainly configured to use a difference between the body contour key point prediction result and the body contour key point marking information as guidance information to perform supervised learning on the first neural network to be trained. The third module 920 is further configured to use a difference between the body contour key point prediction result and the body contour key point marking information as guidance information to perform supervised learning on the input neural network to be trained and the second neural network to be trained. Please refer to the descriptions for operation S320 in FIG. 3 and operation S450 in FIG. 4 for the method embodiment above for the operations executed by the third module 920. Descriptions are not made herein repeatedly.

The first marking module 930 is mainly configured to obtain a body skeleton key point of the image sample; configure an auxiliary line according to the configured body contour key point marking information in a first set and/or the body skeleton key point; and form body contour key point marking information in a second set according to a point selected from the auxiliary line. Please refer to the descriptions for operations S500, S510, and S520 in FIG. 5 for the method embodiment above for the operations executed by the first marking module 930. Descriptions are not made herein repeatedly.

The second marking module 940 is mainly configured to form body contour key point marking information in a third set according to N1 division points on a connection line between two body contour key points in the first set and/or the second set; where N1 is an integer greater than 1. Please refer to the description for operation S530 in FIG. 5 for the method embodiment above for the operation executed by the second marking module 940. Descriptions are not made herein repeatedly.

Figure 10:
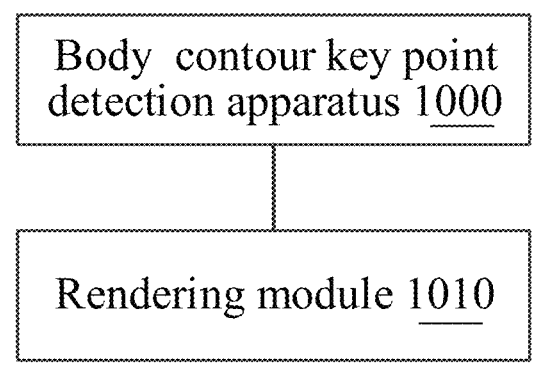
FIG. 10 illustrates a structural schematic diagram of an embodiment of an image processing apparatus of the present disclosure.

FIG. 10 is a structural schematic diagram of an embodiment of an image processing apparatus of the present disclosure. The apparatus in FIG. 10 mainly includes: a body contour key point detection apparatus 1000 and a rendering module 1010.

The body contour key point detection apparatus 1000 is mainly configured to detect the body contour key point of the image block including the body. The body contour key point is used for representing an outer contour of the body. Please refer to the descriptions for FIGS. 1, 3, 4 and 5 for the method embodiment above for the operations executed by the body contour key point detection apparatus 1000. Descriptions are not made herein repeatedly.

The rendering module 1010 is mainly configured to perform AR effect rendering processing on the image block according to the body contour key point. Please refer to the descriptions for operation S610 in FIG. 6 and FIG. 7 for the method embodiment above for the operations executed by the rendering module 1010. Descriptions are not made herein repeatedly.

Exemplary Devices

Figure 11:
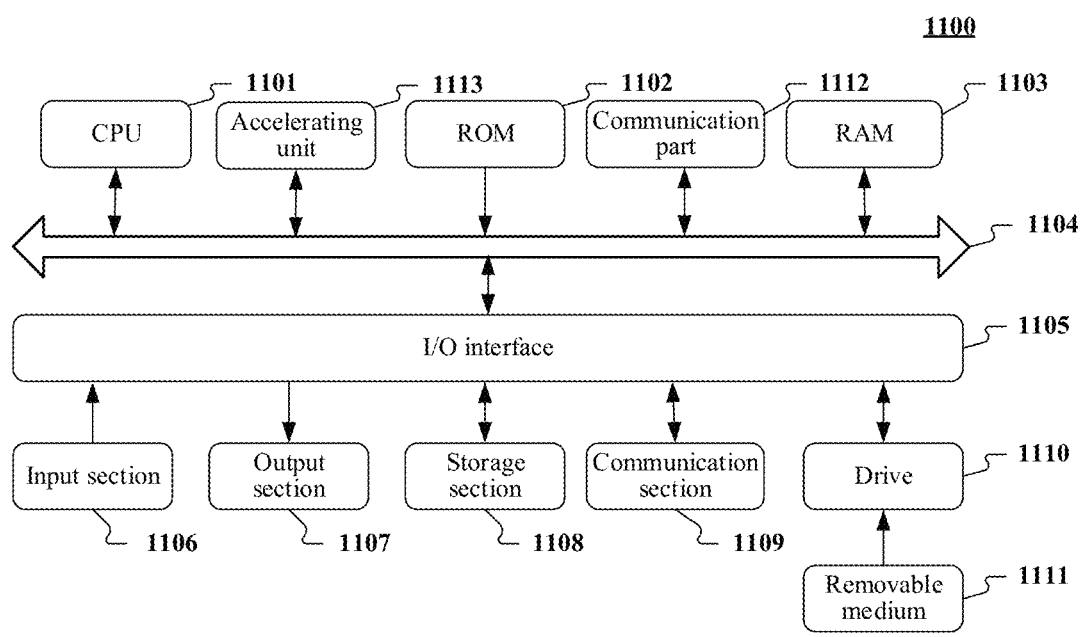
FIG. 11 illustrates a block diagram of an exemplary device for implementing an embodiment of the present disclosure.

FIG. 11 illustrates an exemplary device 1100 suitable for implementing the present disclosure. The device 1100 is a control system/electronic system configured in an automobile, a mobile terminal (such as a smart mobile phone), a PC (such as a desktop computer or a notebook computer), a tablet computer, or a server. In FIG. 11, the device 1100 includes one or more processors, a communication part, and the like. The one or more processors may be, for example, one or more Central Processing Units (CPUs) 1100 and/or one or more accelerating units 1113; the accelerating units 113 may include, but not limited to, GPU, FPGA, and other types of dedicated processors; and the processors may perform various appropriate actions and processing according to executable instructions stored in a Read-Only Memory (ROM) 1102 or executable instructions loaded from a storage section 1108 to a Random Access Memory (RAM) 1103. The communication part 1112 may include, but is not limited to, a network card. The network card may include, but is not limited to, an Infiniband (IB) network card. The processor may communicate with the ROM 1102 and/or the RAM 1130, to execute executable instructions. The processor is connected to the communication part 1104 via a bus 1112, and communicates with other target devices via the communication part 1112, thereby implementing corresponding operations in the present disclosure.

Reference is made to related descriptions in the foregoing method embodiments for the operations executed by the instructions. Descriptions are not made herein in detail. In addition, the RAM 1103 may further store various programs and data required for operations of an apparatus. The CPU 1101, the ROM 1102, and the RAM 1103 are connected to each other via the bus 1104. In the case that the RAM 1103 exists, the ROM 1102 is an optional module. The RAM 1103 stores executable instructions, or writes the executable instructions into the ROM 1102 during running, where the executable instructions cause the CPU 1101 to execute operations included in the foregoing segmentation method. An Input/Output (I/O) interface 1105 is also connected to the bus 1104. The communication part 1112 is integrated, or is configured to have multiple sub-modules (for example, multiple IB network cards) respectively connected to the bus.

The following components are connected to the I/O interface 1105: an input section 1106 including a keyboard, a mouse and the like; an output section 1107 including a Cathode-Ray Tube (CRT), a Liquid Crystal Display (LCD), a speaker and the like; the storage section 1108 including a hard disk and the like; and a communication section 1109 of a network interface card including an LAN card, a modem and the like. The communication section 1109 performs communication processing via a network such as the Internet. A drive 1110 is also connected to the I/O interface 1105 according to requirements. A removable medium 1111 such as a magnetic disk, an optical disk, a magneto-optical disk, a semiconductor memory or the like is mounted on the drive 1110 according to requirements, so that a computer program read from the removable medium is installed on the storage section 1108 according to requirements.

It should be particularly noted that, the architecture illustrated in FIG. 11 is merely an optional implementation mode. During specific practice, the number and types of the components in FIG. 11 may be selected, decreased, increased, or replaced according to actual requirements. Different functional components may be separated or integrated or the like. For example, the accelerating unit and the CPU may be separated, or the accelerating unit may be integrated on the CPU, and the communication part may be separated from or integrated on the CPU or the accelerating unit or the like. These alternative implementations all fall within the scope of protection of the present disclosure.

Particularly, a process described above with reference to a flowchart according to the embodiments of the present disclosure may be implemented as a computer software program. For example, the embodiments of present disclosure include a computer program product. The computer program product includes a computer program tangibly included in a machine-readable medium. The computer program includes a program code for performing operations shown in the flowchart. The program code may include instructions for correspondingly performing operations of the method provided in the present disclosure.

In such implementations, the computer program is downloaded and installed from the network through the communication section 1109, and/or is installed from the removable medium 1111. When the computer program is executed by the CPU 1101, the instructions implementing the corresponding operations recited in the present disclosure are executed.

In one or more implementations, the embodiments of the present disclosure further provide a computer program product configured to store computer-readable instructions, where when the instructions are executed, a computer executes the body contour key point detection method, the neural network training method, or the image processing method in any of the foregoing embodiments.

The computer program product is implemented by means of hardware, software, or a combination thereof. According to one or more embodiments of the present disclosure, the computer program product is specifically represented by a computer storage medium. In another example, the computer program product is represented by a software product, such as Software Development Kit (SDK).

In one or more implementations, the embodiments of the present disclosure further provide another body contour key point detection method, neural network training method, and image processing method, apparatuses corresponding thereto, an electronic device, a computer storage medium, a computer program, and a computer program product. The method includes: a first apparatus sends a body contour key point detection indication, a neural network training indication, or an image processing instruction to a second apparatus, the instruction causing the second apparatus to execute the body contour key point detection method, neural network training method, or image processing method, in any one of the foregoing possible embodiments; and the first apparatus receives a body contour key point detection result, a neural network training result, or an image processing result sent by the second apparatus.

In some embodiments, the body contour key point detection indication, the neural network training indication, or the image processing instruction may be an invocation instruction. The first apparatus instructs, by means of invocation, the second apparatus to perform a body contour key point detection operation, a neural network training operation, or an image processing operation; accordingly, in response to reception of the invocation instruction, the second apparatus may perform operations and/or procedures in any embodiment of the foregoing body contour key point detection method, neural network training method, or image processing method.

It should be understood that the terms such as "first" and "second" in the embodiments of the present invention are only used for distinguishing, and shall not be understood as limitations on the embodiments of the present invention. It should also be understood that, in the present invention, "multiple" may refer to two or more, and "at least one" may refer to one, two or more. It should also be understood that, for any component, data or structure mentioned in the present disclosure, if there is no explicit limitation or no opposite motivation is provided in context, it is generally understood that the number of the component, data or structure is one or more. It should also be understood that, the descriptions of the embodiments in the present disclosure focus on differences between the embodiments, and for same or similar parts in the embodiments, refer to these embodiments. For the purpose of brevity, details are not described again.

The methods, apparatuses, electronic devices, and computer-readable storage media according to the present disclosure may be implemented in many manners. For example, the methods, apparatuses, electronic devices and computer-readable storage media according to the present disclosure may be implemented by using software, hardware, firmware, or any combination of software, hardware, and firmware. The foregoing sequence of the operations of the method is merely for description, and unless otherwise stated particularly, the operations of the method in the present disclosure are not limited to the specifically described sequence. In addition, in some implementations, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The implementations are selected and described to better describe a principle and an actual application of the present disclosure, and to make a person of ordinary skill in the art understand the embodiments of the present disclosure, so as to design various implementations with various modifications applicable to particular use.

The invention claimed is:

1. A body contour key point detection method, performed by an electronic device, comprising:
   obtaining an image feature of an image block comprising a body;
   obtaining, by means of a first neural network, a body contour key point prediction result of the body according to the image feature; and
   obtaining, according to the body contour key point prediction result, a body contour key point in the image block, wherein the body contour key point is used for representing an outer contour of the body,
   wherein the first neural network is trained in advance by means of a training image set comprising body contour key point marking information, wherein the training of the first neural network comprises:
   obtaining an image feature of a sample image block comprising a body;
   obtaining, by means of a first neural network to be trained, a body contour key point prediction result of the body according to the image feature of the sample image block; and
   using a difference between the body contour key point prediction result and the body contour key point marking information as guidance information to perform supervised learning on the first neural network to be trained.

2. The method according to claim 1, wherein the obtaining the image feature of the image block comprising the body comprises:
   performing body detection on an image to be processed; and
   obtaining the image feature of the image block comprising the body in the image to be processed according to a body detection result;
   wherein the image block is the image to be processed, the image block is a partial image comprising a body in the image to be processed, or the image block is an image block obtained by processing the partial image comprising the body in the image to be processed.

3. The method according to claim 2, wherein the performing the body detection on the image to be processed comprises:
   performing the body detection on the image to be processed using a body detector, to obtain a central position of a body bounding box and a body scale factor; wherein the central position of the body bounding box and the body scale factor are used for determining a position of the body bounding box in the image to be processed.

4. The method according to claim 1, wherein the obtaining, by means of the first neural network, the body contour key point prediction result of the body according to the image feature comprises:
   forming, by means of the first neural network, at least one body contour key point response diagram respectively corresponding to at least one body contour key point according to the image feature.

5. The method according to claim 4, wherein each of the at least one body contour key point response diagram comprises a body contour key point confidence diagram, wherein the obtaining the body contour key point in the image block according to the body contour key point prediction result comprises:
   selecting a point meeting a predetermined confidence requirement from any one body contour key point confidence diagram comprised in the at least one body contour key point response diagram; and
   using a mapping position point of the point in the image block as a body contour key point corresponding to the any one body contour key point confidence diagram.

6. The method according to claim 1, wherein the body contour key point comprises at least one of the following: a head contour key point, an arm contour key point, a hand contour key point, a shoulder contour key point, a leg contour key point, a waist contour key point, or a foot contour key point;
   wherein the head contour key point comprises at least one of: a head top key point, a nose tip key point, or a chin key point; or
   the arm contour key point comprises at least one of: a wrist contour key point, an elbow contour key point, an arm root contour key point, a lower arm contour midpoint key point located at a midpoint position between the wrist contour key point and the elbow contour key point, and an upper arm midpoint key point located at a midpoint position between the elbow contour key point or the arm root contour key point; or
   the hand contour key point comprises at least one of: a hand tip key point and a palm midpoint key point; or
   the shoulder contour key point comprises at least one of: a shoulder and head intersection key point located at an intersection position of the shoulder and the head, or a shoulder contour midpoint key point located at a midpoint position between the arm root contour key point and the shoulder and head intersection key point; or
   the leg contour key point comprises at least one of: a crotch key point, a knee contour key point, an ankle contour key point, a thigh root outside contour key point, a shank contour midpoint key point located at a midpoint position between the knee contour key point and the ankle contour key point, a thigh inner contour midpoint key point located at a midpoint position between the knee inner contour key point and the crotch key point, or a thigh outer contour midpoint key point located at a midpoint position between the knee outer contour key point and the thigh root outside contour key point; or
   the waist contour key point comprises at least one of: N−1 equal division points generated by dividing the thigh root outside contour key point or the arm root contour key point into N equal parts, wherein N is greater than 1; or
   the foot contour key point comprises at least one of: a tiptoe key point or a heel key point.

7. The method according to claim 1, wherein the obtaining the image feature of the sample image block comprising the body comprises:
   obtaining an image sample from a training data set; and
   obtaining an image feature of the sample image block comprising the body in the image sample.

8. The method according to claim 7, wherein the obtaining, by means of the first neural network to be trained, the body contour key point prediction result of the body according to the image feature comprises:
   forming, by means of the first neural network to be trained, at least one body contour key point response diagram respectively corresponding to at least one body contour key point according to the image feature.

9. The method according to claim 8, wherein each of the body contour key point response diagram comprises a body contour key point confidence diagram, wherein the using the difference between the body contour key point prediction result and the body contour key point marking information as guidance information to perform supervised learning on the first neural network to be trained comprises:
respectively generating a generated body contour key point confidence diagram for at least one piece of body contour key point marking information; and
using a difference between the body contour key point confidence diagram and the generated body contour key point confidence diagram as guidance information to perform supervised learning on the first neural network to be trained.

10. The method according to claim 9, wherein the respectively generating the body contour key point confidence diagram for at least one piece of body contour key point marking information comprises:
respectively forming a Gaussian response in a predetermined peripheral region of a position in the sample image block corresponding to the at least one piece of body contour key point marking information, and forming a body contour key point confidence diagram separately corresponding to the at least one piece of body contour key point marking information according to the Gaussian response.

11. The method according to claim 8, wherein each of the body contour key point response diagram comprises a formed body contour key point confidence diagram,
wherein the using the difference between the body contour key point prediction result and the body contour key point marking information as guidance information to perform supervised learning on the first neural network to be trained comprises:
selecting a point meeting a predetermined confidence requirement from any one formed body contour key point confidence diagram comprised in the at least one body contour key point response diagram;
using a mapping position point of the point in the image sample as a body contour key point corresponding to the any one formed body contour key point confidence diagram; and
using a difference between the body contour key point corresponding to the any one formed body contour key point confidence diagram and the body contour key point marking information of the image sample as guidance information to perform supervised learning on the first neural network to be trained.

12. The method according to claim 7, wherein the obtaining the image feature of the sample image block comprising the body comprises:
performing body detection on the image sample;
providing a body detection result and the image sample to an input neural network to be trained, to obtain, by means of the input neural network to be trained, the sample image block comprising the body, wherein the sample image block has a predetermined size; and
obtaining the image feature of the sample image block using a second neural network to be trained.

13. The method according to claim 12, wherein the training of the first neural network further comprises:
using a difference between the body contour key point prediction result and the body contour key point marking information as guidance information to perform supervised learning on the input neural network to be trained and the second neural network to be trained.

14. The method according to claim 7, wherein a configuring process for the body contour key point marking information carried in the image sample comprises:
obtaining a body skeleton key point of the image sample;
configuring an auxiliary line according to at least one of the configured body contour key point marking information in a first set or the body skeleton key point; and
forming, according to a point selected from the auxiliary line, body contour key point marking information in a second set.

15. The method according to claim 14, wherein the configuring process for the body contour key point marking information carried in the image sample further comprises:
forming body contour key point marking information in a third set according to N1 division points on a connection line between two body contour key points in at least one of the first set or the second set;
wherein N1 is an integer greater than 1.

16. The method according to claim 14, wherein the configuring the auxiliary line according to at least one of the configured body contour key point marking information in the first set or the body skeleton key point comprises:
determining, according to the body skeleton key point, a first auxiliary line passing through an arm root inner contour key point and vertical to an upper arm direction; and
the forming, according to the point selected from the auxiliary line, the body contour key point marking information in the second set comprises:
forming, according to an intersection point of the first auxiliary line and an upper arm outer contour, marking information of the arm root outer contour key point in the second set.

17. The method according to claim 14, wherein the configuring the auxiliary line according to the configured body contour key point marking information in the first set and/or the body skeleton key point comprises:
configuring a second auxiliary line passing through a crotch key point and vertical to a thigh direction formed by the body skeleton key point; and
the forming, according to the point selected from the auxiliary line, the body contour key point marking information in the second set comprises:
forming, according to an intersection point of the second auxiliary line and a thigh outer contour, marking information of the thigh root outside contour key point in the second set.

18. An electronic device, comprising:
a processor; and
a memory for storing instructions executable by the processor;
wherein execution of the instructions by the processor causes the processor to perform:
obtaining an image feature of an image block comprising a body;
obtaining, by means of a first neural network, a body contour key point prediction result of the body according to the image feature; and
obtaining, according to the body contour key point prediction result, a body contour key point in the image block, wherein the body contour key point is used for representing an outer contour of the body,
wherein the first neural network is trained in advance by means of a training image set comprising body contour key point marking information, wherein the training of the first neural network comprises:

obtaining an image feature of a sample image block comprising a body;

obtaining, by means of a first neural network to be trained, a body contour key point prediction result of the body according to the image feature of the sample image block; and using a difference between the body contour key point prediction result and the body contour key point marking information as guidance information to perform supervised learning on the first neural network to be trained.

19. A non-transitory computer-readable storage medium, configured to store computer-readable instructions, wherein execution of the instructions by the processor causes the processor to perform:

obtaining an image feature of an image block comprising a body;

obtaining, by means of a first neural network, a body contour key point prediction result of the body according to the image feature; and obtaining, according to the body contour key point prediction result, a body contour key point in the image block, wherein the body contour key point is used for representing an outer contour of the body, wherein the first neural network is trained in advance by means of a training image set comprising body contour key point marking information, wherein the training of the first neural network comprises:

obtaining an image feature of a sample image block comprising a body;

obtaining, by means of a first neural network to be trained, a body contour key point prediction result of the body according to the image feature of the sample image block; and using a difference between the body contour key point prediction result and the body contour key point marking information as guidance information to perform supervised learning on the first neural network to be trained.

\* \* \* \* \*